United States Patent [11] 3,612,402

[72] Inventors Richard H. Timms
San Diego;
Leonard Holman, Imperial Beach, both of Calif.
[21] Appl. No. 887,061
[22] Filed Dec. 22, 1969
[45] Patented Oct. 12, 1971
[73] Assignee Rohr Corporation
Chula Vista, Calif.

[54] THRUST-CONTROLLING APPARATUS WITH VARIABLE AXIAL FLOW AREA FOR DIFFERING FLIGHT REGIMES AND THRUST REVERSAL
20 Claims, 5 Drawing Figs.
[52] U.S. Cl. ................................................. 239/265.29,
239/127.3, 239/265.41
[51] Int. Cl. ...................................................... B64c 15/06
[50] Field of Search ............................................ 239/265.13,
265.19, 265.25, 265.29, 265.31, 265.33, 265.37,
265.39, 265.41, 127.3; 60/229

[56] References Cited
UNITED STATES PATENTS
| | | | |
|---|---|---|---|
| 2,933,890 | 4/1960 | Morrison | 239/265.31 |
| 2,952,124 | 9/1960 | Pearson | 239/265.13 |
| 3,347,467 | 10/1967 | Carl et al. | 239/265.13 X |
| 3,372,876 | 3/1968 | Colville et al. | 239/265.13 X |
| 3,374,631 | 3/1968 | Marks | 239/265.19 X |
| 3,503,211 | 3/1970 | Medawar et al. | 239/265.29 X |

*Primary Examiner*—M. Henson Wood, Jr.
*Assistant Examiner*—John J. Love
*Attorney*—George E. Pearson ABSTRACT: Apparatus includes shroud positioned at rear or jet nozzle to surround and control gas stream. Shroud includes forward fixed section secured to engine at outlet flange or tailpipe and aft section axially movably mounted to fixed section. In stowed position aft section cooperates with forward section to define shroud as substantially imperforate conduit in continuation outlet or tailpipe. In deployed position, one or more gaps are formed between forward end of aft section and rearward end of forward section for reverse thrust gas flow. Diversion plug coaxial with shroud varies axial flow area for differing flight regimes. Swingable flaps or blades form trailing edge of aft section and vary shape of outer wall. Blades and plug are operable independently to produce all necessary outlet combinations. For reverse thrust, plug is expanded and aft section deployed. Blocker doors on inner wall of aft section are caused to swing into engage-expanded plug and block axial rearward flow of gas, forcing it through reverse thrust openings.

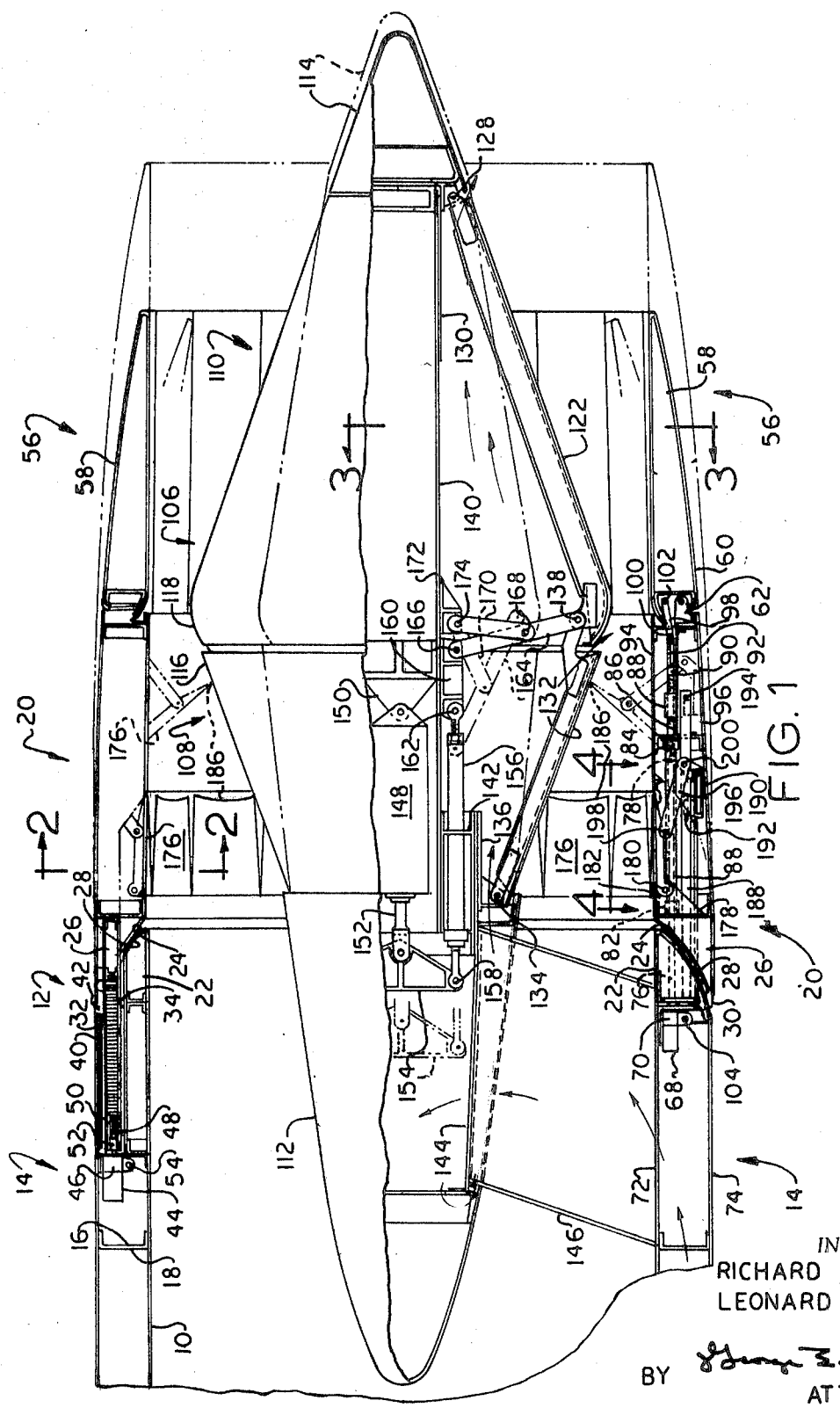

INVENTOR.
RICHARD H. TIMMS
LEONARD HOLMAN

BY
ATTORNEY

INVENTOR.
RICHARD H. TIMMS
LEONARD HOLMAN

BY
ATTORNEY

THRUST-CONTROLLING APPARATUS WITH VARIABLE AXIAL FLOW AREA FOR DIFFERING FLIGHT REGIMES AND THRUST REVERSAL

BACKGROUND OF THE INVENTION

This invention lies in the field of gas turbine engines, more commonly called jet engines, which produce reaction thrust by ejecting a high-velocity stream of gas from the exhaust nozzle of the gas turbine. Airplanes driven by jet engines fly and land at much higher speeds than propeller-driven aircraft. Their high-landing speed puts a great burden on the wheel brakes and of course they do not have propellers which are readily reversible to produce reverse thrust. Therefore it is necessary to provide apparatus to reverse the gas stream to accomplish this result.

It is also highly desirable to be able to control effective thrust in flight. This is particularly so in the case of tactical military airplanes, which may be required to decelerate rapidly in combat maneuvers or limit their speed in steep dives in bombing operations. Conventionally, speed brakes are used for this purpose.

Various types of thrust reversers have been in use for many years, primarily to reduce landing run, although some have been successfully used in flight to reduce forward speed more rapidly than by throttling the engine. All of them utilize a basic principle of blocking the rearward flow of the exhaust gas stream and diverting it laterally. If the stream has no forward component it will act in the manner of a speed brake by interference with the free airstream. Normally, however, the stream is directed substantially forwardly to produce an actual reverse thrust. One common type uses a pair of deflectors which meet externally behind the nozzle to divert the stream laterally in opposite directions, usually with a forward component. Another similar type has doors mounted within the nozzle to block flow, lateral openings in the nozzle, and doors or deflectors which normally cover these openings, but may be swung outward to uncover the openings and direct the diverted streams laterally and forwardly. In another type, doors within the nozzle may be moved to block flow, and cascade passages are uncovered in the sidewalls to allow the gas to issue laterally and forwardly.

All of these systems work reasonably well but they have various drawbacks. They are difficult to modulate and normally are used only in fully deployed position. The external target type, with deflectors behind the nozzle, requires considerable supporting structure and usually has larger deflectors than is desirable. Also, it is difficult to arrange a pivotal mounting which will make them "fail-safe"; i.e., mounted so that in the event the actuating mechanism fails they will be urged by the gas stream toward stowed position. The other types have rather complicated mechanism which is subject to possible trouble or failure.

It is also highly desirable, particularly in military airplanes, to be able to vary the exit throat area through a wide range and also to be able to vary the total shape of the outlet through a wide range of convergent and convergent-divergent forms. Attempts to combine these requirements with suitable thrust-reversing means have not so far met with outstanding success. One example of such variable throat mechanism is disclosed in Glass U.S. Pat. No. 3,391,869, which is assigned to the assignee of the present invention.

SUMMARY OF THE INVENTION

The present invention provides apparatus which accomplishes all of the functions mentioned above in a relatively simple manner and with a high degree of dependability. The shape of the thrust gas outlet of a jet engine can be varied for all conditions from takeoff to supersonic flight with afterburner, and thrust reversal can be fully modulated for various flight conditions as well as for landing roll.

Generally stated, the apparatus includes a shroud having a forward section fixedly connected to the engine and an aft section axially movably mounted to the forward section. When the aft section is stowed, it cooperates with the forward section to define the shroud as a substantially imperforate conduit, coaxial with the outlet or tailpipe of the engine and acting as a continuation thereof.

When the aft section is deployed rearwardly, one or more gaps are formed between the formerly adjacent edges of the forward and aft sections and these gaps define lateral flow paths through the shroud wall for the exhaust gas which is blocked from rearward flow. The adjoining edges of the sections may lie in a single transverse plane if it is desired to provide a complete annular reverse thrust opening.

A diversion plug is located coaxially in the shroud and has a generally streamlined form, the intermediate portion of said plug being expandable and contractable to vary the outlet area at the throat zone. The trailing edge portion of the aft shroud section is made up of a plurality of circumferentially arranged flaps or blades pivotally mounted at their forward edges to the fixed part of the aft section substantially at the throat zone when the aft section is stowed. The lateral margins of the blades engage each other in sliding sealed relation and the blades swing in unison toward and away from the axis of the shroud to vary the exit cone. The control of the blades is independent of the control of the plug and thus it is possible to achieve a wide range of outlet configurations for differing flight regimes.

Thrust control is achieved by expanding the plug to a predetermined degree and deploying the aft shroud section to a predetermined extent. As the shroud moves rearwardly, a plurality of blocker doors swing inwardly toward the plug. Since the controls are separate, any degree of blocking can be attained. This is particularly valuable in controlling the diving maneuvers of combat airplanes. For maximum thrust reversal during ground roll, the plug is fully expanded and the aft shroud section is fully deployed, causing the blocker doors to move substantially into contact with the expanded plug and prevent any rearward flow of gases so that they must all pass through the reverse thrust openings.

BRIEF DESCRIPTION OF THE DRAWINGS

Various other advantages and features of novelty will become apparent as the description proceeds in conjunction with the accompanying drawings, in which:

FIG. 1 is a schematic side elevational view, partly in section, showing the total apparatus in one preferred form;

DESCRIPTION OF PREFERRED EMBODIMENTS

Figure 3:
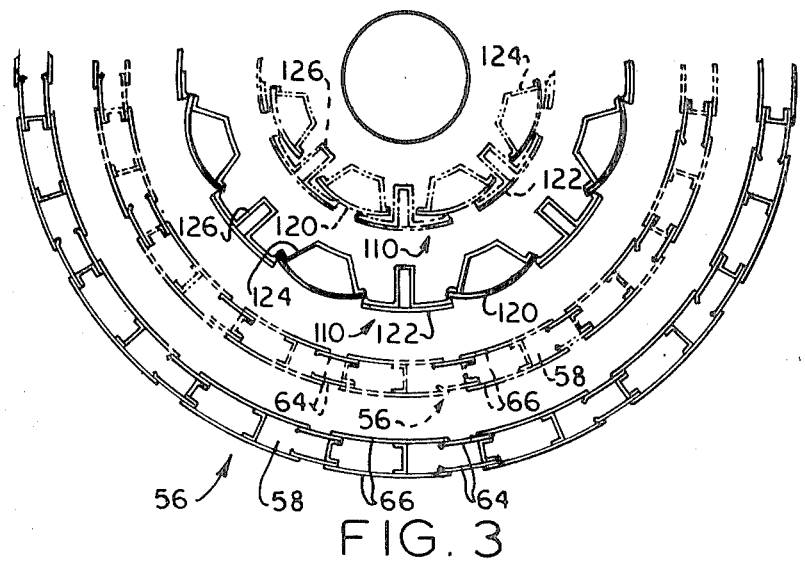
FIG. 3 is a schematic partial sectional view taken on line 3—3 of FIG. 1.

The thrust-controlling apparatus of this invention may be used with any conventional engine installation whether wing or fuselage mounted, and operates in the same way in all instances. For convenience of illustration it is shown in FIG. 1 as mounted coaxially directly aft of the engine outlet or tailpipe 10. The shroud 12 includes a forward section 14 fixedly secured to the engine and with its leading edge 16 in direct, sealed contact with the engine or tailpipe flange 18. Shroud 12 further includes an aft section 20 in direct continuation of the forward section and axially movably mounted thereto by means to be detailed later. When the aft section is in stowed position, as indicated by solid lines, it cooperates with the forward section to define the shroud as a substantially imperforate conduit forming a direct coaxial continuation of the nozzle and acting to surround and control the exhaust gas stream issuing from the nozzle.

The forward shroud section 14 is provided with an annular trailing edge 22 having a face 24 which converges rearwardly and serves as the forward wall of a lateral passage through the shroud when the aft shroud section 20 is deployed. The leading edge 26 of the aft section is provided with a corresponding face 28 which forms the rear wall of the lateral passage on deployment. Because of the rearwardly converging surfaces, the exhaust gas which exits therebetween when the aft section is deployed will have a forward component of about 45° to produce a very high degree of reverse thrust. In some cases a full annular opening is desired, and faces 24 and 28 are full annuli. Seal member 30, carried by leading edge 26, contacts surface 24 to prevent escape of exhaust gas during normal flight.

Figure 2:
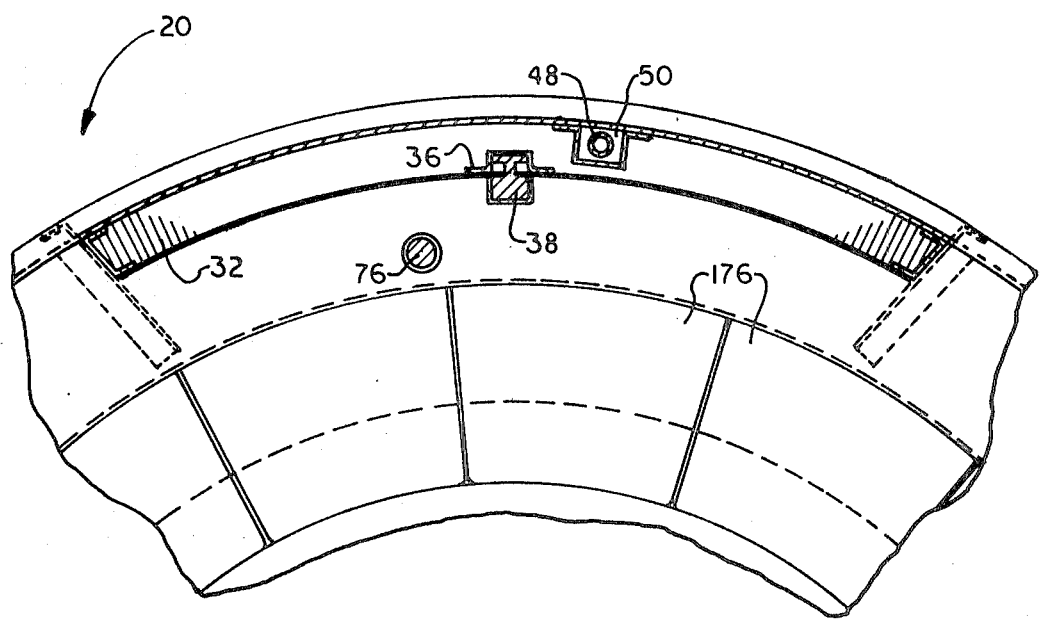
FIG. 2 is a schematic partial sectional view taken on line 2—2 of FIG. 1 with the aft shroud section in the deployed position indicated by the broken lines.

There are many installations where it is preferable to provide a plurality of arcuate lateral openings separated by shielded portions to prevent discharge of gas against structural elements. For this purpose the shroud is modified at a plurality of areas around the circumference, one of which is illustrated in the upper portion of FIG. 1. Considering FIGS. 1 and 2, it will be seen that an arcuate portion of leading edge 26 is extended forwardly to serve as a blanking panel 32 which is axially movable in a recess 34 in the outer wall of section 14. This blanking panel is a structural member integral with the main body of aft section 20 and is provided with a guide 36 which slides axially on track 38 fixedly secured to section 14. The track and guide provide the sliding support of aft section 20 on forward section 14. Recess 34 is provided with a cover plate 40 which overlies the forward part of the blanking panel, and a seal member 42 carried by leading edge 26 engages the aft edge of the cover plate. Suitable sealing means may also be provided along the lateral edges of the blanking panel if desired.

The aft shroud section is moved between stowed and deployed position by mechanism including an actuator 44, such as an electric motor, connected through gearbox 46 to a drivescrew 48. The latter extends axially in a channel 50 formed in the blanking panel and is in driving engagement with a nut 52 which is fixedly mounted in the forward end of the channel. There is one such complete mechanism (except the actuator) for each of the blanking panels spaced around the periphery of the shroud and synchronism between the drives is maintained by a flexible drive shaft 54 connected between the several gearboxes. The motor is fully controllable to position the aft section 20 at any point along its path of travel.

The shroud is a continuation of the nozzle outer wall. In order to vary its exit area and cone of convergence, the trailing portion 56 of aft section 20 comprises a plurality of circumferentially arranged flaps or blades 58, each connected at its leading edge 60 to a pivotal mounting 62 so that each blade can swing toward and away from the axis of the shroud. Referring to FIG. 3 which shows the blades in expanded position in solid lines and in contracted position in broken lines, it will be seen that each blade 58 is formed as an elongate hollow box with leaves 64 and 66 forming extensions of its lateral edges. The leaves 64 of one blade slide within the leaves 66 of the adjacent blade to provide for variation of the angle of convergence while maintaining an imperforate wall to prevent leakage of gas between the blades.

All of the blades 58 are swung inward and outward in unison by the mechanism illustrated in the lower portion of FIG. 1. This mechanism includes an actuator such as an electric motor 68 and a gearbox 70, mounted between the inner and outer walls 72 and 74 of the forward shroud section 14. A shaft 76 driven by the gearbox extends rearward through suitable openings in faces 24 and 28, terminating in a splined portion 78. The shaft is slidably mounted within a tube 80 rotatably mounted in bearings 82 and 84 for translation with the aft section 20. The tube is internally splined throughout its length so that it may translate with respect to shaft 76 while being rotatably driven by the splined connection at any point of translation, thus constituting it a variable length force transmitting means.

Rearward of bearing 84, the tube 80 is united to drivescrew 86 which is threaded through nut 88 fixedly mounted within aft section 20 and terminates in a rotatable but nonsliding connection 90 with the axially movable actuating ring 92. It will be apparent that rotation of drivescrew 86 in nut 88 will produce axial movement of ring 92 which extends annularly between the inner and outer walls 94 and 96 of the aft section 20. Link 98 is pivotally connected to the ring at 100 and to blade 58 at 102 to swing the blade angularly in response to translation of the ring. There is a complete drive mechanism (except the actuator) at each location around the periphery where there is a blanking panel and synchronism is achieved by the use of flexible drive shafts 104 connecting the gearboxes.

An expandable and contractable diversion plug 106 serves as a nozzle inner wall and a means to vary the throat area. It also cooperates with the shroud to establish varying degrees of nozzle convergent and divergence and to produce varying degrees of thrust reversal. In general, it includes a forward cone section 108 diverging rearwardly and an aft cone section 110 diverging forwardly, and is provided with a tapered nose member 112 and a tapered tail member 114 giving the total plug a streamlined configuration. The bases 116 and 118 of the cones meet in a plane transverse to the axis of the shroud adjacent to the plane defining the throat zone. The bases could meet directly at the throat zone, but the aft cone section is extended slightly forward thereof as shown for streamlining purposes. Thus the throat zone is actually in the plane of maximum diameter of the aft cone section. It will be noted that the pivotal mountings 62 for blades 58 are substantially in the plane of the throat zone when aft shroud section 20 is stowed. This location facilitates formation of the various outlet configurations necessary for differing flight regimes.

To achieve a substantially smooth conical surface at all stages of expansion, each of said cone sections is constructed substantially in the manner illustrated in FIG. 3 which shows a portion of the aft cone section. The cone is made up of a plurality of fore and aft extending elongate petals 120 and 122 respectively reinforced by box or hat sections 124 and 126, the petals 120 lying inwardly adjacent to petals 122 and arranged in sliding contact in all stages of expansion to provide a seal against leakage of gas. Petals 120 are angularly bent along their centerlines and petals 122 are arcuately curved, the assembly providing a generally circular cross section at any transverse plane.

Returning to FIG. 1, it will be seen that all of the petals 120 and 122 are pivotally connected at a circumferential series of pivot points 128 to a collar 130. Petals 132 of the forward cone section 108 are similarly connected at 134 to a collar 136. Each set of one forward petal and one aft petal are pivotally connected at their base ends by a pivot pin 138 substantially in the plane of the throat zone.

The supporting and operating structure for plug 106 comprises a supporting tube 140 located coaxially within the shroud, a spacer ring 142 at the forward end of tube 140, and a second tube 144 extending forward of the spacer ring and rigidly secured to the inner ends of a plurality of circumferentially spaced hollow struts 146, the outer ends of which are rigidly secured to the inner wall 72 of the forward shroud section 14. The tapered nose member 112 is in turn rigidly secured to tube 144 with its aft end slightly spaced radially outward of the forward end of cone section 108.

Coaxially located within supporting tube 140 is an actuator comprising a cylinder 148 connected to bracket 150, a piston, not shown, and a piston rod 152 extending from the forward end of the cylinder, the actuator being operable in known manner. A force transfer member 154 is mounted at the free end of the piston rod and a plurality of actuator links 156 are connected at their forward ends to member 154 by pivot pins 158 and are connected at their aft ends to a sliding collar 160 by pivot pins 162.

The sliding collar 160 forms a part of a straight line motion linkage which includes a first link 164 pivotally connected at its inner end to collar 160 at 166 and pivotally connected at its outer end to a set of petals, 122, 132 at 138. A second, shorter link 170 is pivotally connected at its inner end to fixed collar 172 at 174 and is pivotally connected at is outer end to an intermediate point 168 of link 164. The lengths of links 164 and 170 and the point of attachment 168 are so chosen that as collar 160 slides forward link 170 will constrain the outer end of link 164 to move radially inward in substantially a straight line in the transverse plane of the throat zone, carrying with it the petals 122 and 132.

There are a plurality of these straight line motion linkages spaced peripherally around collars 160 and 172, each moving in a plane containing the axis of the shroud, and they all move in unison to expand and contract the bases of the cone sections. The change in the base diameters changes the heights, or axial lengths, of the cone sections and accordingly collars 130 and 136 are slidingly mounted on tube 140 and spacer ring 142 to accommodate the variation. While nose member 112 is fixedly mounted on tube 144, tail member 114 is directly connected to collar 130 and moves axially with it.

As previously pointed out, the controls for the plug 106 and the blades 58 are independent. Therefore the plug may be moved to any stage of expansion with blades 58 remaining set, and the blades may be moved to any degree of convergence with the plug remaining set. Consequently the two may be relatively arranged to define any degree of convergent or convergent-divergent outlet configuration for all types of operation from takeoff to supersonic flight with afterburner.

Figure 4:
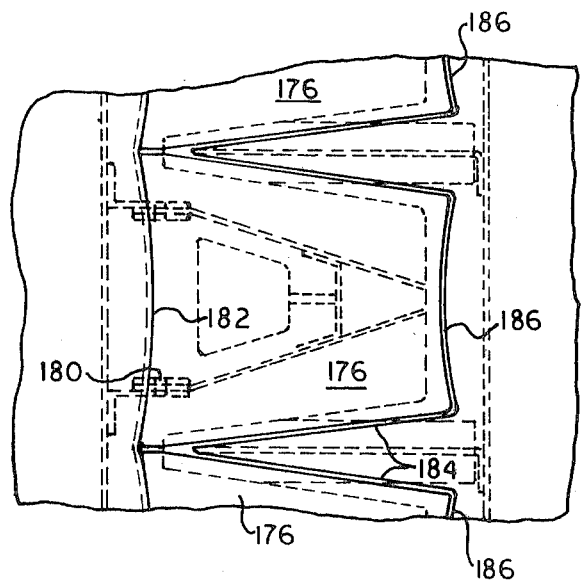
FIG. 4 is a schematic partial plan view taken on line 4—4 of FIG. 1.

For modulated or complete thrust reversal the aft shroud section 20 is deployed rearward to the desired extent in the manner previously described, partially or fully opening the lateral flow paths through the wall of the shroud. In order to block rearward flow and redirect the gas through the lateral openings, blocker doors 176 are provided adjacent to the leading edge of aft cowl section 20. A series of these doors extends completely around the inner wall 94, each being set in a recess at its leading edge to bracket 178 at 180. The arrangement and planform of the doors is shown in FIG. 4, where it will be seen that their leading edges 182 form a substantially continuous ring while their lateral edges 184 are tapered. With this configuration edges 184 will just touch each other as their trailing edges 186 contact the surface of the plug, thus completely blocking axial rearward flow of the exhaust gas stream.

The means for actuating the blocker doors includes a track 188 fixedly secured to the structure of forward shroud section 14 and extending rearwardly through suitable openings in faces 24 and 28 into the aft section. An actuating ring 190 is slidable on track 188 between limits set by contact with stop members 192 and 194 on the track. Initial rearward movement of section 20 carries the ring rearward until it contacts stop member 194, and section 20 then moves rearwardly with respect to the ring. Link 196 is connected at its forward end to an intermediate point on door 176 by pivot pin 198 and is connected at its aft end to ring 190 by pivot pin 200. The relative forward movement of ring 190 during the later stage of deployment of section 20 applies axial force along the length of link 196 to move the door to its deployed position shown in broken line in contact with or immediately adjacent to the surface of the expanded plug. Reverse movement allows the doors to return to stowed position. In the event of failure of the deployment mechanism for section 20, the gas force on the door acts to return the door and section 20 to stowed position, providing "fail-safe" capability. It will be understood that ring 190 extends around the circumference of section 20 between inner and outer walls 94 and 96 and is carried by a plurality of tracks 188. A link 196 is provided for each door.

Since plug 106 is located directly in the path of the exhaust gas at all times it is desirable to provide a cooling system. Cooling air from the engine fan or other source passes rearwardly between the dual walls of nozzle 10, then between the walls of section 12 through struts 146 into tube 144, where it passes forwardly into nose member 112 and rearwardly into tube 140 and around the actuator. It then passes rearwardly over the interior and exterior surfaces of the cone sections. As a result, all portions of the plug are maintained at a temperature much lower than that of the exhaust gas.

Figure 5:
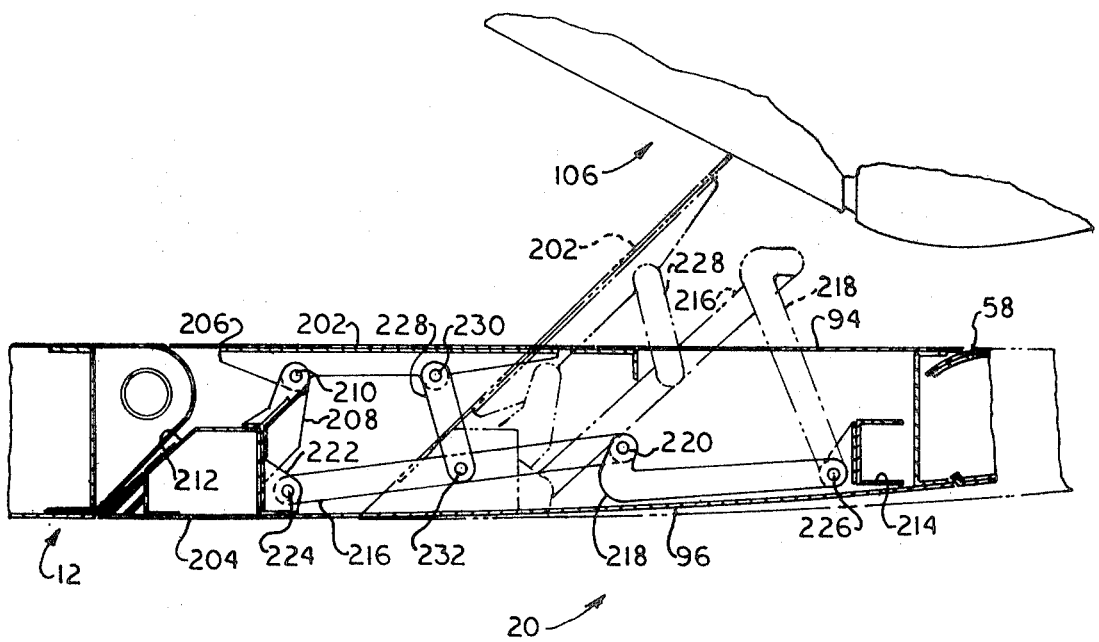
FIG. 5 is a schematic side elevational view, partly in section, of a modified form of blocker door operating mechanism.

A modified form of actuating mechanism for the blocker doors is illustrated in FIG. 5, this mechanism providing for graduated movement of the doors throughout the movement of aft shroud section 20, the opening of the lateral flow paths always being sufficient to compensate for the reduction of open area at the throat zone. In this form, the operating mechanism for moving the aft shroud section 20 and the blades 58, as well as the expandable plug 106, is the same as in the form previously described.

A blocker door 202 is located in a recess in the inner wall 94 of the aft shroud section 20 adjacent to the leading edge 204 and is pivoted slightly behind its own leading edge 206 on bracket 208 by means of pivot pin 210. When the door is fully deployed, it inner surface is in alignment with angled face 202 of leading edge 204 to form the rear wall of the lateral opening for reverse thrust flow. An actuating means in the form of an abutment ring 214 is located between walls 94 and 96 but is fixedly connected by suitable structure to the forward shroud section 12 so that it is relatively movable forwardly from the solid line position with respect to the aft shroud section 20 when the latter moves rearwardly toward its deployed position.

A pair of toggle links 216 and 218 are arranged in generally fore and aft relation and are pivotally connected to each other by pivot pin 220. Link 216 is generally straight while link 218 is generally L-shaped so that when it lies against outer wall 96 the ends of the links and their pivotal connection will not be in alignment. Link 216 is connected to bracket 222 by a pivot pin 224 and link 218 is connected to abutment ring 214 by pivot pin 226. A drive link 228 is connected at one end to door 202 by pivot pin 230 and is connected at its opposite end to link 216 by pivot pin 232.

When section 20 is deployed rearwardly, it carries bracket 222 back toward stationary abutment ring 214. Since pivot 220 is not in line with pivots 224 and 226, the toggle linkage will "break" upwardly as seen in the figure. Thus, link 216 will swing counterclockwise and apply force along the length of drive link 228 which in turn will swing door 202 toward its deployed position. There is no lost motion in any part of this mechanism so door 202 will move generally proportionally with movement of section 20 and will arrive at the broken line position just as section 20 is fully deployed. Since the lateral flow opening commences to enlarge immediately and the door has little effect in its initial movement, the lateral opening will always overcompensate for the reduction of area at the throat zone.

It will be understood that a series of blocker doors extends completely around the periphery of section 20 as in the previous form and that there is a toggle linkage mechanism associated with each door. Also, as in the previous form, gas pressure on the doors acts in a "fail-safe" manner to return the doors and aft shroud section to stowed position in event of mechanical failure.

What is claimed as new and useful and desired to be secured by U.S. Letters Patent is:

1. Thrust controlling apparatus for use in combination with a jet engine having a rearwardly discharging exhaust outlet or tailpipe, comprising: a shroud carried by said engine and located rearwardly of the exit end of said outlet or tailpipe and coaxial therewith to surround and control the exhaust gas stream issuing from said outlet or tailpipe; and a streamlined diversion plug mounted coaxially within the shroud to define the inner wall of the flow path for the exhaust gas stream; the intermediate portion of the plug being expandable and contractable to vary the flow path area for differing flight regimes; said shroud including means to provide lateral flow path means through its wall and means to coact with the expanded plug to block rearward flow of the exhaust gas stream and redirect it through the lateral flow path means to produce reverse thrust.

2. Apparatus as claimed in claim 1; said shroud including a fixed forward section and an aft section axially movably mounted on the forward section and adapted in its stowed, forward position to cooperate with the forward section to define said shroud as an elongate substantially imperforate conduit; said aft section being movable rearwardly to a deployed position in which at least part of its forward end is spaced rearwardly from the rearward end of the fixed section to define said lateral flow path means through the wall of the shroud.

3. Apparatus as claimed in claim 2; the means to coact with the expanded plug comprising a series of peripherally arranged blocked doors pivotally mounted to the inner wall of the aft section of the shroud sand swingable into engagement with the expanded plug; said doors being formed and arranged to completely close the rearward flow path in fully deployed position.

4. Apparatus as claimed in claim 3; said doors being provided with linkage means adapted to cause their deployment and stowage in response to movement of the aft section to deployed and stowed positions.

5. Apparatus as claimed in claim 1; the intermediate portion of said plug comprising a forward cone section diverging rearwardly and an aft cone section diverging forwardly; the bases of said cone sections meeting in a plane transverse to the nozzle axis and defining a throat zone of variable area.

6. Apparatus as claimed in claim 5; the trailing portion of the aft shroud section comprising a plurality of circumferentially arranged blades, each connected at its forward edge to a pivotal mounting on the aft shroud section; said pivotal mountings, when the aft shroud section is in stowed position, lying in said transverse plane at the throat zone; and means to swing said blades in unison to selected angular positions independent of the condition of expansion of the diversion plug to modify the shape of the outer nozzle wall for differing flight regimes.

7. Apparatus as claimed in claim 6; the lateral margins of said blades having sealing means in slidable engagement with adjacent blades to produce a substantially imperforate continuation of the outer nozzle wall in all positions of adjustment.

8. Apparatus as claimed in claim 1; the intermediate portion of said diversion plug comprising a forward cone section diverging rearwardly and an aft cone section diverging forwardly; the bases of said cone sections meeting in a plane transverse to the nozzle axis and defining a throat zone of variable area; a first support member at the forward end of said forward cone section; said forward section comprising a plurality of fore and aft extending elongate petals arranged in laterally overlapping and sliding relation; said petals being pivotally mounted at their forward ends on said first support member; a second support member at the aft end of the aft cone section; said aft section comprising a plurality of petals similar to those of the forward section and pivotally mounted at their aft ends to the second support member; a peripherally arranged series of straight line motion linkages located in the general transverse plane of the throat zone and each having an outer free end movable radially in said plane; the adjacent ends of the petals of the forward and aft cone sections being pivotally connected in pairs to the outer free ends of said linkages to move radially therewith and vary the base diameters of the cone sections; and means to actuate all of said linkages in unison.

9. Apparatus as claimed in claim 8; said first and second support members being axially movable to provide for changes in the axial lengths of the cone sections in response to changes in their base diameters.

10. Apparatus as claimed in claim 9; a fixedly mounted tapered nose member extending forwardly ahead of the forward cone section; and a tapered tail member extending rearwardly of the aft cone section and mounted on said second support member for axial movement therewith.

11. Apparatus as claimed in claim 8; including a plurality of peripherally spaced radially extending struts within said shroud and having their outer ends fixedly secured to the inner wall thereof at its forward end; and elongate support tube arranged coaxially in said shroud and fixedly secured at its forward end to the inner ends of said struts; said support members comprising rings axially slidably mounted on said tube; said straight line motion linkages being mounted on the outer wall of said tube intermediate its ends; said means to actuate said linkages being mounted within said tube; and actuator links connecting said actuating means to said linkages.

12. Apparatus as claimed in claim 8; including an elongate support tube fixedly mounted coaxially in said shroud; a first ring fixedly mounted on said tube; a second ring mounted for axial sliding movement on said tube forward of said first ring; each of said straight line motion linkages comprising a first link pivotally connected at its inner end to said second ring and pivotally connected at its outer end to a set of fore and aft petals and a second shorter link pivotally connected at its inner end to the first ring and pivotally connected at its outer end to an intermediate point of the first link; both of said links being swingable in a plane containing the axis of the tube and so proportioned and connected that axial movement of the second ring will cause radial movement of the outer end of the first link substantially in the plane of the throat zone; said means to actuate the linkages including a cylinder coaxially mounted in said tube; a piston rod axially movably carried by said cylinder; a force transfer member carried at the outer free end of the piston rod; and a plurality of actuator links connected at one end to the force transfer mechanism and at the other end to the second ring.

13. Apparatus as claimed in claim 1; said shroud including a fixed forward section and an aft section axially movably mounted on the forward section; the trailing portion of the aft shroud section comprising a plurality of circumferentially arranged blades, each connected at its forward edge to a pivotal mounting on the aft shroud section for swinging toward and away from the axis of the shroud to modify the shape of the outer nozzle wall for differing flight regimes; axially movable means adjacent to said pivotal mountings to cause said blades to swing in unison; force applying means carried by said forward section; and variable length force-transmitting means extending between said force-applying means and said axially movable means operable to vary the axial position of the latter in any stage of deployment of the aft section.

14. Apparatus as claimed in claim 1; said shroud including a fixed forward section and an aft section axially movably mounted on the forward section and adapted in its stowed, forward position to cooperate with the forward section to define said shroud as an elongate substantially imperforate conduit; said aft section being movable rearwardly to a deployed position in which at least part of its forward end is spaced rearwardly from the corresponding part of the rearward end of the fixed section to define said lateral flow path means through the wall of the shroud; the means to coact with the expanded plug comprising a series of peripherally arranged blocker doors pivotally mounted at their forward ends to the inner wall of the aft shroud section and swingable inwardly to positions in which their inner ends are in substantial adjacency with the surface of the expanding plug; a drive link pivotally connected at its first end to each of said blocker doors; actuating means axially movable with respect to the aft section and connected to the second end of said drive link to apply force along the length of said drive link to swing the door to its deployed position.

15. Apparatus as claimed in claim 14; said drive link and actuating means being so arranged with respect to the door that the force of the exhaust gas stream on the door will force the door and the aft shroud section toward stowed position in the event of failure of the aft section deploying means.

16. Apparatus as claimed in claim 14; said actuating means being movable with the aft shroud section during the first part of its deploying movement; and stop means to limit the travel of the actuating means and cause it to urge the door to deployed position.

17. Apparatus as claimed in claim 14; track means secured to the forward shroud section and extending axially rearward into the aft shroud section; said actuating means comprising an actuating ring slidable on said track means; and stop means associated with the track means to limit rearward movement of the actuating ring.

18. Apparatus as claimed in claim 14; said actuating means being fixedly mounted with respect to the forward shroud section; a pair of toggle links connected at one end to the actuating means and at the other end to the aft shroud section; an intermediate portion of one of the toggle links being connected to the second end of said drive link; the relative movement of the aft section and the actuating means causing folding of the toggle links and deployment of the door.

19. Apparatus as claimed in claim 14; said actuating means comprising an actuating ring located intermediate the ends of the aft shroud section; an anchorage at the forward end of the aft shroud section; and a pair of toggle links lying in stowed position generally parallel to the axis of the shroud; the forward toggle link at its free end being pivotally connected to said anchorage and laterally spaced from the door, with its intermediate portion connected to the second end of said drive link; the aft toggle link at its free end being pivotally connected to the actuating ring; rearward movement of the aft shroud section with respect to the actuating ring causing folding of the toggle links and deployment of the door.

20. Apparatus as claimed in claim 19; the arrangement and dimensions of the links being chosen to cause gradual opening of the lateral flow path means at a greater rate than the gradual closing of the axial flow path means to prevent any reduction of the total outlet area for emission of the exhaust gas stream.